United States Patent
Kim et al.

(10) Patent No.: US 8,259,653 B2
(45) Date of Patent: Sep. 4, 2012

(54) APPARATUS AND METHOD FOR SUPPORTING MCBCS PROXY SELECTION FOR MCBCS AND MACRO DIVERSITY IN WIRELESS COMMUNICATION SYSTEM

(75) Inventors: Bong-Ho Kim, San Jose, CA (US); Su-Lyun Sung, Anyang (KR)

(73) Assignee: Seah Networks Co., Ltd., Seoul (KR)

( * ) Notice: Subject to any disclaimer, the term of this patent is extended or adjusted under 35 U.S.C. 154(b) by 299 days.

(21) Appl. No.: 12/745,490

(22) PCT Filed: Nov. 27, 2008

(86) PCT No.: PCT/KR2008/006997
§ 371 (c)(1),
(2), (4) Date: May 28, 2010

(87) PCT Pub. No.: WO2009/069951
PCT Pub. Date: Jun. 4, 2009

(65) Prior Publication Data
US 2010/0302986 A1    Dec. 2, 2010

Related U.S. Application Data

(60) Provisional application No. 60/991,574, filed on Nov. 30, 2007.

(30) Foreign Application Priority Data

Nov. 19, 2008  (KR) .................. 10-2008-0115381

(51) Int. Cl.
*H04W 4/00* (2009.01)
(52) U.S. Cl. ......... 370/328; 370/312; 370/331; 370/326
(58) Field of Classification Search .................. 370/312, 370/331, 326; 455/101, 104, 105; 375/299, 375/267, 347
See application file for complete search history.

(56) References Cited

U.S. PATENT DOCUMENTS

| | | | | |
|---|---|---|---|---|
| 5,392,285 | A * | 2/1995 | Kurts ............................ | 370/407 |
| 5,533,027 | A * | 7/1996 | Akerberg et al. ............. | 370/347 |
| 6,665,705 | B1 * | 12/2003 | Daniels-Barnes et al. .... | 709/203 |
| 7,548,552 | B2 * | 6/2009 | Shvodian et al. ............. | 370/449 |
| 8,010,138 | B2 * | 8/2011 | Kuru ............................ | 455/502 |
| 2002/0193116 | A1 * | 12/2002 | Agrawal et al. ............... | 455/445 |
| 2006/0159118 | A1 * | 7/2006 | Shvodian et al. ............. | 370/449 |
| 2007/0032241 | A1 * | 2/2007 | Busch et al. .................. | 455/450 |

(Continued)

OTHER PUBLICATIONS

Tao Jiang et al., "Multicast Broadcast Services Support in OFDMA-Based WiMAX Systems", Advances in Mobile Multimedia, IEEE Communications Magazine, Aug. 2007, pp. 78-86, vol. 45, Issue 8.

(Continued)

*Primary Examiner* — Huy D Vu
*Assistant Examiner* — Omer Mian

(57) ABSTRACT

An apparatus and method for supporting MultiCast and BroadCast Service (MCBCS) proxy selection for MCBCS and macro diversity in a wireless communication system is provided. The apparatus and method selects a first MCBCS proxy among MCBCS proxies in the plurality of ASNs as a master MCBCS proxy, and selects other MCBCS proxies except for the first MCBCS proxy as slave MCBCS proxies, and the first MCBCS proxy transmits information for macro diversity to the slave MCBCS proxies, wherein the master MCBCS proxy first receives an MCBCS join message from a Mobile Station (MS) in one Multicast and Broadcast Service (MBS) zone.

15 Claims, 2 Drawing Sheets

U.S. PATENT DOCUMENTS

| | | | |
|---|---|---|---|
| 2007/0213078 A1 | 9/2007 | Shaheen | |
| 2007/0220573 A1 | 9/2007 | Chiussi et al. | |
| 2007/0253360 A1* | 11/2007 | Jalil et al. | 370/328 |
| 2008/0037460 A1* | 2/2008 | Venkatachalam | 370/328 |
| 2008/0146213 A1* | 6/2008 | Kim et al. | 455/422.1 |
| 2008/0253322 A1* | 10/2008 | So et al. | 370/329 |
| 2008/0287136 A1* | 11/2008 | Ludwig et al. | 455/446 |
| 2009/0047913 A1* | 2/2009 | Kuru | 455/76 |
| 2009/0103466 A1* | 4/2009 | Gu et al. | 370/312 |
| 2009/0103467 A1* | 4/2009 | Barber et al. | 370/312 |
| 2009/0325627 A1* | 12/2009 | Lee | 455/522 |
| 2010/0157901 A1* | 6/2010 | Sanderovitz et al. | 370/328 |
| 2010/0322128 A1* | 12/2010 | Becker et al. | 370/312 |
| 2011/0136526 A1* | 6/2011 | Park et al. | 455/509 |

OTHER PUBLICATIONS

International Search Report for PCT/KR2008/006997 filed Nov. 27, 2008.

Written Opinion of the International Searching Authority for PCT/KR2008/006997 filed Nov. 27, 2008.

\* cited by examiner

[Fig. 1]
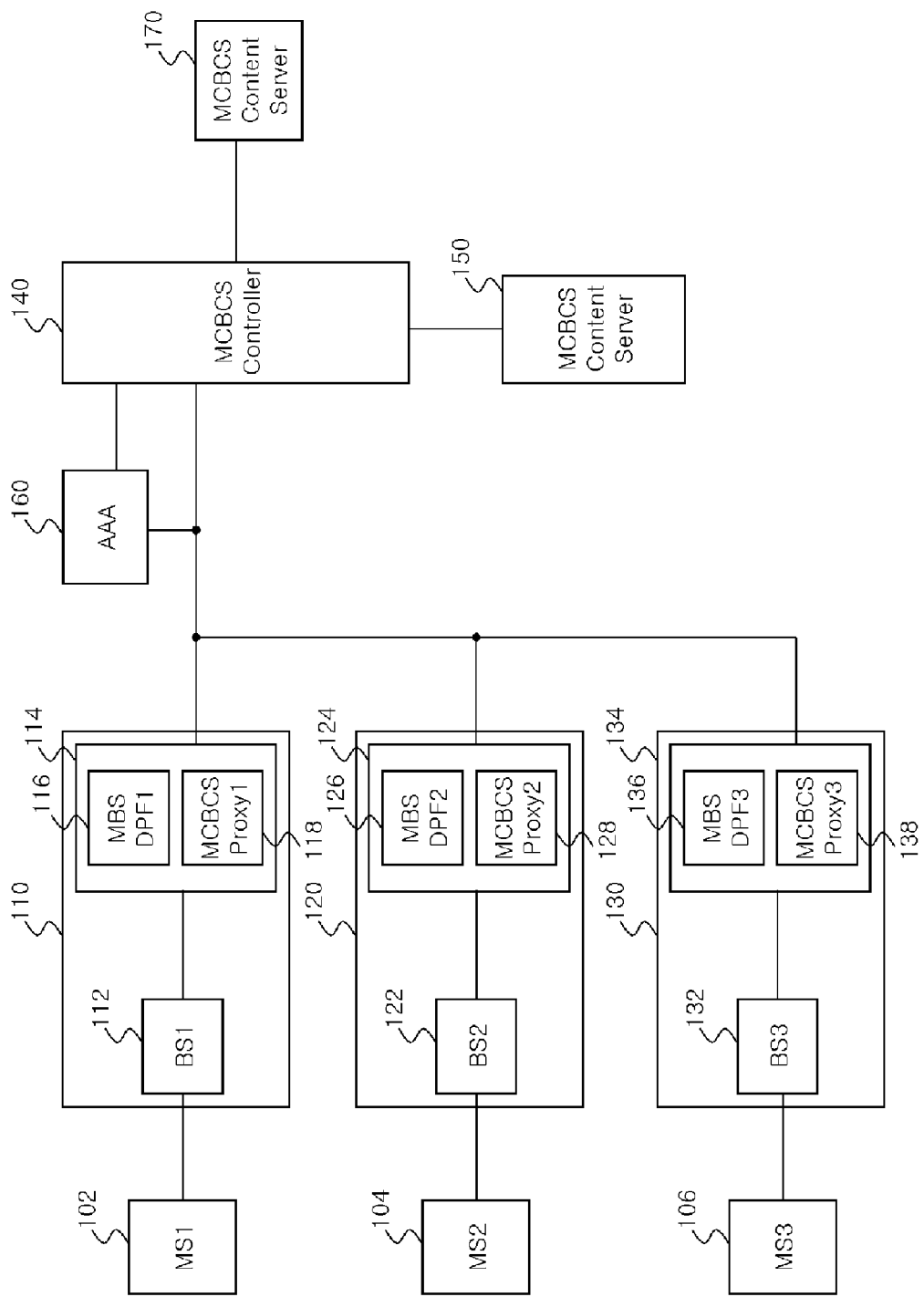

[Fig. 2]
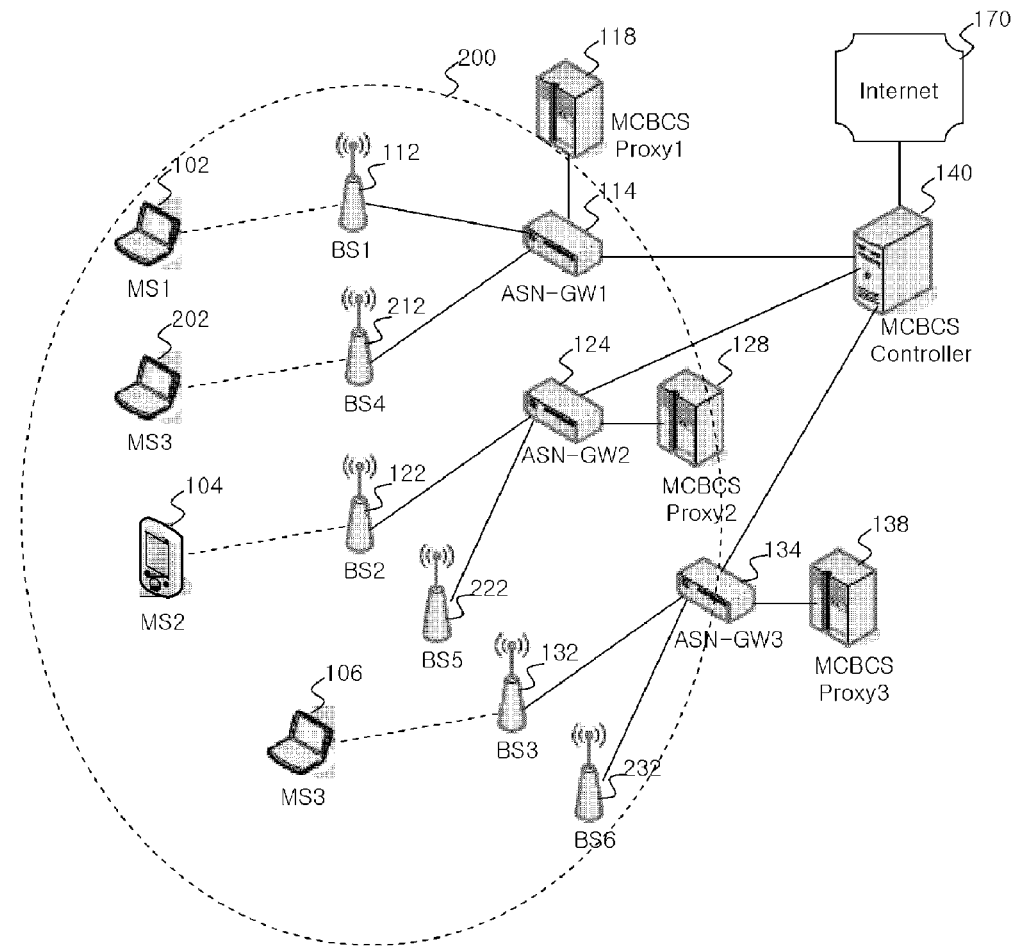
[Fig. 3]
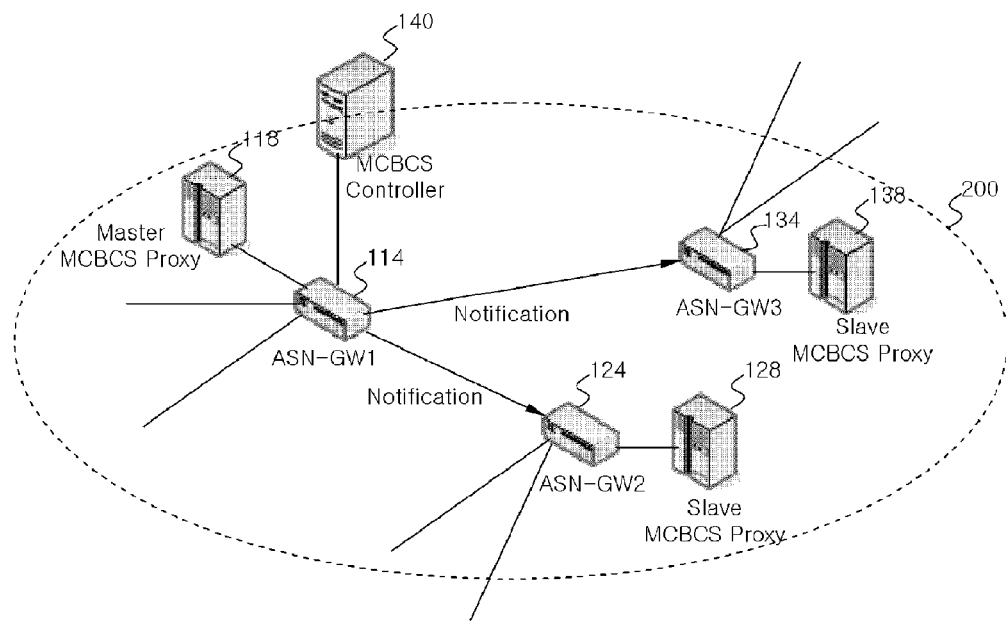

APPARATUS AND METHOD FOR SUPPORTING MCBCS PROXY SELECTION FOR MCBCS AND MACRO DIVERSITY IN WIRELESS COMMUNICATION SYSTEM

TECHNICAL FIELD

The present invention relates generally to a wireless communication system, and in particular, to an apparatus and method for supporting MultiCast and BroadCast Service (MCBCS) proxy selection for MCBCS and macro diversity in a wireless communication system.

BACKGROUND ART

Wireless communication systems are evolving to support various services such as broadcast, multimedia video, multimedia message, etc. Particularly, in the next-generation wireless communication system, intensive research is being conducted to stably provide users with high-speed services having various Quality-of-Service (QoS) levels. Further, in recently the next-generation wireless communication system, intensive research is being conducted to stably provide high-speed services while guaranteeing mobility and QoS, and the typical next-generation communication system may include a Portable Internet system or Worldwide Interoperability for Microwave Access (WiMAX) system based on Institute of Electrical and Electronics Engineers (IEEE) 802.16 standard.

However, as for the WiMAX system, its detailed plan to support MCBCS and macro diversity, supported by the IEEE 802.16 standard, has not yet been proposed. Therefore, there is a demand for a detailed plan to support MCBCS and macro diversity, and in particular, there is a demand for a detailed plan to efficiently support MCBCS and macro diversity in a wireless network where a plurality of Access Service Networks (ASNs) exist in one Multicast and Broadcast Service (MBS) zone supporting MCBCS.

DISCLOSURE OF INVENTION

Technical Problem

An aspect of the present invention is to address at least the problems and/or disadvantages and to provide at least the advantages described below. Accordingly, an aspect of the present invention is to provide a detailed apparatus and method for supporting MCBCS and macro diversity in a wireless communication system.

Another aspect of the present invention is to provide an apparatus and method for supporting MCBCS proxy selection for MCBCS and macro diversity when a plurality of ASNs exist in one MBS zone in a wireless communication system.

Technical Solution

According to one aspect of the present invention, there is provided a method for supporting MultiCast and BroadCast Service (MCBCS) proxy selection for MCBCS and macro diversity in a wireless communication system including a plurality of Access Service Networks (ASNs) for MCBCS in one Multicast and Broadcast Service (MBS) zone. The method includes selecting a first MCBCS proxy among MCBCS proxies in the plurality of ASNs as a master MCBCS proxy, and selecting other MCBCS proxies except for the first MCBCS proxy as slave MCBCS proxies; and transmitting, at the first MCBCS proxy, information for macro diversity to the slave MCBCS proxies; wherein the master MCBCS proxy first receives an MCBCS join message from a Mobile Station (MS) in the MBS zone.

According to another aspect of the present invention, there is provided a method for managing MultiCast and BroadCast Service (MCBCS) proxy for MCBCS and macro diversity in a wireless communication system including a plurality of Access Service Networks (ASNs) for MCBCS in one Multicast and Broadcast Service (MBS) zone. The method includes receiving, at an MCBCS proxy, an MCBCS join message from a Mobile Station (MS) in the MBS zone; checking, at the MCBCS proxy, whether the MS is a first MS for MCBCS in the MBS zone based on the MCBCS join message; setting, at the MCBCS proxy, the MCBCS proxy itself as a master MCBCS proxy when the MS is a first MS; notifying, at the MCBCS proxy, the setting of the master MCBCS proxy to an MCBCS controller for a session start procedure, and notifying the setting of the master MCBCS proxy to other MCBCS proxies so that the other MCBCS proxies are set as slave MCBCS proxies for the MCBCS; and transmitting, at the MCBCS proxy, Layer 2 information to be assigned for the macro diversity to the slave MCBCS proxies according to the session start procedure.

According to still aspect of the present invention, there is provided an apparatus for supporting MultiCast and BroadCast Service (MCBCS) proxy selection for MCBCS and macro diversity in a wireless communication system including a plurality of Access Service Networks (ASNs) for MCBCS in one Multicast and Broadcast Service (MBS) zone. The apparatus includes a reception unit for receiving an MCBCS join message from a Mobile Station (MS); an MCBCS proxy setting unit for checking whether the MS is a first MS for MCBCS in the MBS zone based on the MCBCS join message, and setting a status of the MCBCS proxy as a master when the MS is a first MS; a transmission unit for notifying the setting of the master to an MCBCS controller for a session start procedure, and to other MCBCS proxies in the MBS zone so that the other MCBCS proxies are set as slave MCBCS proxies for the MCBCS, or transmitting Layer 2 information to the other MCBCS proxies for the macro diversity; and an information generation unit for generating the Layer 2 information according to the session start procedure, and transmitting the Layer 2 information to the transmission unit.

Advantageous Effects

The present invention provides a detailed plan to support MCBCS and macro diversity in a wireless communication system, thereby making it possible to obtain macro diversity gain for MCBCS when providing MCBCS contents. In addition, the present invention can realize and operate a system or apparatus for efficiently supporting MCBCS and macro diversity through MCBCS proxy selection in a wireless network where a plurality of ASNs exist.

BRIEF DESCRIPTION OF THE DRAWINGS

The above and other aspects, features and advantages of the present invention will become more apparent from the following detailed description when taken in conjunction with the accompanying drawings in which:

FIG. 1 is a diagram schematically illustrating a WiMAX system in a wireless communication system according to an embodiment of the present invention;

FIG. 2 is a diagram schematically illustrating a WiMAX system for supporting MCBCS and macro diversity in a wireless communication system according to an embodiment of the present invention; and FIG. 3 is a diagram illustrating an operation of selecting MCBCS proxies at a WiMAX system to support MCBCS and macro diversity in a wireless communication system according to an embodiment of the present invention.

MODE FOR THE INVENTION

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

The present invention provides an apparatus and method for supporting MultiCast and BroadCast Service (MCBCS) proxy selection for MCBCS and macro diversity and a method for managing MCBCS proxies in a wireless communication system, e.g. Broadband Wireless Access (BWA) communication system, such as Portable Internet system or Worldwide Interoperability for Microwave Access (WiMAX) system based on the Institute of Electrical and Electronics Engineers (IEEE) 802.16 system. Although a description of the present invention is described with reference to the Portable Internet system or WiMAX system based on the IEEE 802.16 standard as an example of the wireless communication system, the method for supporting MCBCS and macro diversity, proposed by the present invention, can be applied even to the wireless communication systems based on another system.

Also, an embodiment of the present invention supports MCBCS and macro diversity to a Multicast and Broadcast Service (MBS) zone which is provided the MCBCS from WiMAX system or network, when the MBS zone includes a plurality of Access Service Networks (ASNs). Wherein, MBS zone, according to the IEEE 802.16 and WiMAX standards, means a zone where a plurality of Base Station (BSs) provide services using the same Connection Identifier (CID) and the same Security Association (SA) in order to transmit MCBCS contents, and the MBS zone can be identified by an MBS zone identifier. Alternatively, either one ASN or a plurality of ASNs can be included in the MBS zone.

In the wireless communication system/network where a plurality of ASNs are included in one MBS zone, each ASN includes an ASN-Gateway (ASN-GW) connected to at least one BS. For MCBCS, each ASN includes as many MCBCS proxies as the number of ASN-GWs, and for MCBCS to one MBS zone where a plurality of ASNs are included, a plurality of MCBCS proxies are included in each ASN.

Besides, in order to support MCBCS and macro diversity based on the IEEE 802.16 standard, all BSs in one MBS zone should have the same configuration information used for generating MBS-MAP. In other words, all BSs should acquire the same MCBCS control information/Layer 2 information for MCBCS and macro diversity, such as information on modulation, subchannel, symbol, offset and Multicast Connection Identifier (MCID), and information on the time they will transmit MCBCS contents. Only one MCBCS proxy among a plurality of MCBCS proxies for one MBS zone should assign MCBCS control information/Layer 2 information so that all BSs may acquire the same MCBCS control information/Layer 2 information in this way.

Therefore, the present invention selects one MCBCS proxy among the plurality of MCBCS proxies so that only one MCBCS proxy among the plurality of MCBCS proxies for one MBS zone assigns the MCBCS control information/Layer 2 information in a centralized management scheme, and proposes a master MCBCS proxy and slave MCBCS proxies in order to select the one MCBCS proxy. In other words, in order to support MCBCS and macro diversity to one MBS zone, an embodiment of the present invention selects one MCBCS proxy among a plurality of MCBCS proxies for the one MBS zone, sets the selected MCBCS proxy as a master MCBCS proxy, and sets the remaining MCBCS proxies as slave MCBCS proxy.

Herein, each MCBCS proxy for the one MBS zone maintains and stores/manages a list of other MCBCS proxies in the one MBS zone. The master MCBCS proxy means an MCBCS proxy that controls all MCBCS proxies among a plurality of MCBCS proxies in order to efficiently perform an MCBCS proxy function when the plurality of MCBCS proxies exist in the one MBS zone due to a plurality of ASN-GWs. The slave MCBCS proxies mean MCBCS proxies that perform an MCBCS proxy function under the control of the master MCBCS proxy. Regarding the master MCBCS proxy, an MCBCS proxy of an ASN-GW having a first MBS receiver, e.g., a first Mobile Station (MS), that intends to receive MCBCS contents in the MBS zone, is set as a master MCBCS proxy. The first MBS receiver in the MBS zone means an MS that first transmitted an MCBCS join message in order to first receive MCBCS in the MBS zone. Thus, the master MCBCS proxy means an MCBCS proxy of an ASN-GW that has first received an MCBCS join message from an MS in the MBS zone and checks that the MS is a first/initial MS for MCBCS in the MBS zone.

An ASN-GW having the first MBS receiver in its own zone in the MBS zone, in other words, an ASN-GW that has received an MCBCS join message from the first MS, among a plurality of ASN-GWs in the MBS zone, sets its own MCBCS proxy as a master MCBCS proxy, and notifies the setting of the master MCBCS proxy to MCBCS proxies of the other ASN-GWs in the MBS zone, and the other ASN-GWs set their own MCBCS proxies as slave MCBCS proxy when the other ASN-GWs receive the notification indicating the setting of the master MCBCS proxy. The ASN-GW, which has set the master MCBCS proxy, notifies the setting of the master MCBCS proxy to an MCBCS controller in a Connectivity Service Network (CSN). Herein, the ASN-GW, which has set the master MCBCS proxy, notifies the setting of the master MCBCS proxy by transmitting a notification message, and the notification message includes therein an MCBCS proxy s Identifier (ID) indicating that the corresponding MCBCS proxy is the master MCBCS proxy.

When a plurality of MCBCS proxies for one MBS zone are determined as a master MCBCS proxy and slave MCBCS proxies in this manner, the MCBCS controller performs a session start process with an ASN-GW of the master MCBCS proxy, and the master MCBCS proxy of the ASN-GW receives session information from the MCBCS controller, and assigns MCBCS control information/Layer 2 information, which is need for MCBCS and macro diversity, i.e., information of modulation, subchannel, symbol, offset and MCID, and time information used for transmitting MCBCS contents. Further, the master MCBCS proxy of the ASN-GW transmits the assigned MCBCS control information/Layer 2 information to the BSs located in its own zone and the slave MCBCS proxies in a broadcast/multicast scheme. The slave MCBCS proxies of the ASN-GWs transmit the received MCBCS control information/Layer 2 information to the BSs located in their own zones, simply providing relay paths between the master MCBCS proxy and their BSs. As a result, all BSs existing in one MBS zone generate MBS-MAP using the same MCBCS control information/Layer 2 information, and provide MCBCS contents to MSs existing in the MBS zone through the MBS-MAP, and at this time, the MSs obtain macro diversity gain. With reference to FIG. 1, a detailed description will now be made of a WiMAX system in a wireless communication system according to an embodiment of the present invention.

FIG. 1 is a diagram schematically illustrating a WiMAX system in a wireless communication system according to an embodiment of the present invention.

Referring to FIG. 1, a WiMAX system includes a plurality of MSs 102, 104 and 106; a plurality of ASNs 110, 120 and 130 that provide MCBCS contents to the MSs 102, 104 and 106; a CSN that controls the plurality of ASNs 110, 120 and 130 by managing one MBS zone; and a content provider that creates and provides the MCBCS contents. Herein, the ASN 110, 120 and 130 include BSs 112, 122 and 132 each serving as a Radio Access Station (RAS) that transmits MCBCS contents in the MBS zone in a broadcast/multicast scheme, and ASN-GWs 114, 124 and 134 which are connected to the BSs 112, 122 and 132, and transmit the MCBCS contents thereto. The CSN includes an MCBCS server (not shown) that performs MCBCS control and MCBCS content provision functions; an Authentication Authorization Accounting (AAA) server 160 that takes charge of authentication, authorization and accounting on the MSs 102, 104 and 106; and a Policy Function (PF) server (not shown) that takes charge of various communication protocols when providing the MCBCS contents. The content provider includes an MCBCS content server 170 that creates corresponding MCBCS contents for MCBCS.

The ASN-GWs 114, 124 and 134 include MBS Data Path Function (DPF) modules 116, 126 and 136 for controlling data paths of their associated ASNs; MCBCS proxies 118, 128 and 138 for performing an MCBCS proxy function; and Service Flow Authorization (SFA) modules (not shown) for authorizing MCBCS service flows for MCBCS content provision to the MSs 102, 104 and 106.

Further, the MCBCS server includes a content server 150 for transmitting the MCBCS contents provided from the MCBCS content server 170 of the content provider, to the ASNs 110, 120 and 130, and an MCBCS controller 140 for performing a control function when providing the MCBCS contents from the content server 150 to the MSs 102, 104 and 106.

The AAA server 160, as described above, performs authentication, authorization and accounting on the MSs 102, 104 and 106, and the content provider through the support of the ASN-GWs 114, 124 and 134, and the MCBCS server. The PF server supports an operation of providing MCBCS contents according to various communication protocols, e.g. supports resource allocation and resource reservation based on the communication protocols when providing the MCBCS contents. The content provider creates MCBCS contents corresponding to MCBCS that the MSs 102, 104 and 106 desire to receive, e.g. to location-based service, video/audio service, interne web service, voice/video conference service, etc, and transmits the created MCBCS contents to the MCBCS server. With reference to FIG. 2, a further detailed description will now be made of a WiMAX system for supporting MCBCS and macro diversity in a wireless communication system according to an embodiment of the present invention.

FIG. 2 is a diagram schematically illustrating a WiMAX system for supporting MCBCS and macro diversity in a wireless communication system according to an embodiment of the present invention.

Referring to FIG. 2, a WiMAX system includes the constituent elements described in FIG. 1, and in particular, a plurality of ASNs are included in one MBS zone 200. Accordingly, each ASN included in one MBS zone 200 has ASN-GWs 114, 124 and 134, and also has MCBCS proxies 118, 128 and 138, the number of which is equal to the number of the ASN-GWs 114, 124 and 134. Alternatively, the ASN-GWs 114, 124 and 134 can be designed such that the MCBCS proxies 118, 128 and 138 are mounted thereon, or such that they can control the MCBCS proxies 118, 128 and 138.

One MBS zone 200, as described above, includes BSs 112, 122, 132, 212, 222 and 232 connected to the ASN-GWs 114, 124 and 134; MSs 102, 104, 106 and 202 for receiving MCBCS contents from the BSs 112, 122, 132, 212, 222 and 232; an MCBCS controller 140 for controlling provision of the MCBCS contents; and an MCBCS content server 170 for providing, for example, the internet web service, as the content provider.

When a plurality of ASNs are included in the one MBS zone 200, the MCBCS proxies 118, 128 and 138 each support all or a selected one(s) of the functions listed in Table 1, for MCBCS and macro diversity.

As shown in Table 1, the MCBCS proxies 118, 128 and 138 each manage interworking with the PF server for MCBCS, and a Service Flow Identifier (SFID) for MCBCS, and assign a static MCID and a dynamic MCID corresponding to a static multicast scheme and a dynamic multicast scheme, respectively. Further, the MCBCS proxies 118, 128 and 138 each perform a Radio Resource Management (RRM) function for MCBCS, and a function of mapping an MCBCS data transmission region to the MBS zone. In addition, the MCBCS proxies 118, 128 and 138 each support security of MCBCS contents in a Layer 2 level, and assign static air resources and dynamic air resource. At this time, the MCBCS proxies 118, 128 and 138 each assign the same air resources to all BSs in the MBS zone in order to support macro diversity. Besides, the MCBCS proxies 118, 128 and 138 each manage the MSs 102, 104, 106 and 202 that will receive the MCBCS contents, in other words, manage MSs belonging to an MCBCS group, control MCBCS accounting and synchronization for supporting macro diversity, and manage a list of the MBS zone. The MCBCS proxies 118, 128 and 138 each can support all or a selected one(s) of the above functions.

TABLE 1

| Functional entity | Detail Feature | Remark |
|---|---|---|
| MCBCS proxy | The management of SFID for MCBCS | |
| | Static MCID assignment | |
| | Dynamic MCID assignment | |
| | MCBCS RRM function | |
| | Mapping function of transmission region to MBS zone | |
| | Layer 2 security support | |
| | Static air resource assignment | |
| | Dynamic air resource assignment | |
| | MCBCS group member management | |
| | Accounting service | |
| | Time synch mechanism for macro diversity | |
| | MBS zone list management | |

As described above, in order to support MCBCS and macro diversity to one MBS zone 200, all BSs in the one MBS zone 200 should acquire the same configuration information for generating MBS-MAP, i.e., the same MCBCS control information/Layer 2 information. To this end, the present invention selects a master MCBCS proxy and slave MCBCS proxies among the plurality of MCBCS proxies 118, 128 and 138 for the one MBS zone 200.

Although not illustrated in detail, the MCBCS proxies 118, 128 and 138 of the ASN-GW 114, 124 and 134 for one MBS zone 200 each include a reception unit for receiving an MCBCS join message from an MS(s); an MCBCS proxy setting unit for setting the corresponding MCBCS proxy itself as a master MCBCS proxy or a slave MCBCS proxy by checking a first MBS receiver, e.g. first MS; an information generation unit for receiving session information from the MCBCS controller 140 in response to a notification message indicating the setting of the master MCBCS proxy, and generating MCBCS control information/Layer 2 information using the received session information, when the corresponding MCBCS proxy is set as the master MCBCS proxy; a transmission unit for transmitting the notification message to slave MCBCS proxies of other ASN-GWs and the MCBCS controller 140, and transmitting the MCBCS control information/Layer 2 information to its BSs and the slave MCBCS proxies of other ASN-GWs, when the corresponding MCBCS proxy is set as the master MCBCS proxy; and a list storage unit for maintaining and storing/managing a list of other MCBCS proxies in the one MBS zone 200. When the corresponding MCBCS proxy is set as a slave MCBCS proxy, the transmission unit transmits the MCBCS control information/Layer 2 information received from the master MCBCS proxy to the BSs, simply providing a relay path between the master MCBCS proxy and the BSs. With reference to FIG. 3, a detailed description will now be made of an operation of selecting a master MCBCS proxy and slave MCBCS proxies to support MCBCS and macro diversity.

FIG. 3 is a diagram illustrating an operation for selecting MCBCS proxies at a WiMAX system to support MCBCS and macro diversity in a wireless communication system according to an embodiment of the present invention.

Referring to FIG. 3, an MCBCS controller 140 of a WiMAX system performs a Service Advertisement procedure for starting sessions of a plurality of ASNs included in one MBS zone 200 for MCBCS, registering a data path, and notifying the MCBCS contents it will provide to the MBS zone 200. An ASN-GW 114 having a first MBS receiver, in other words, an MS that have first transmitted an MCBCS join message to receive MCBCS contents in the one MBS zone 200, among a plurality of ASN-GWs due to the plurality of ASNs, sets its own MCBCS proxy as a master MCBCS proxy 118. Herein, the MCBCS proxy, which is set as the master MCBCS proxy 118, is an MCBCS proxy that has checked the first receiver in one MBS zone 200 by first receiving a join message before it is set as a master/slave MCBCS proxy, and this MCBCS proxy is an MCBCS proxy that has set its own status as a master.

Further, the ASN-GW 114, which has set the master MCBCS proxy 118, transmits a notification message including therein an MCBCS proxy ID indicating the master MCBCS proxy, to the MCBCS controller 140 and other ASN-GWs 124 and 134 in the MBS zone 200. When the other ASN-GWs 124 and 134 receive the notification message from the ASN-GW 114, the other ASN-GWs 124 and 134 set their own MCBCS proxies as slave MCBCS proxies 128 and 138.

Herein, in order to support MCBCS and macro diversity to one MBS zone 200 as described above, the MCBCS proxies 118, 128 and 138 for the one MBS zone 200 each maintain and store/manage a list of other MCBCS proxies. When there is a plurality of MCBCS proxies, the master MCBCS proxy 118 means an MCBCS proxy that controls all MCBCS proxies among the plurality of MCBCS proxies in order to efficiently perform an MCBCS proxy function, and the slave MCBCS proxies 128 and 138 mean MCBCS proxies that perform an MCBCS proxy function under the control of the master MCBCS proxy 118.

When the other ASN-GWs 124 and 134 except for the ASN-GW 114 having the first MBS receiver in the MBS zone 200 have the first MBS receiver, the ASN-GWs 114, 124 and 134 having the first MBS receiver each set its own MCBCS proxy as a master MCBCS proxy, and then transmit a notification message including its own MCBCS proxy ID to the other ASN-GWs and the MCBCS controller 140. Since the MCBCS proxies 118, 128 and 138 are time-synchronized with each other, the MCBCS proxies 118, 128 and 138, and the MCBCS controller 140 can check the reception time of the join messages of the ASN-GWs 114, 124 and 134, in other words, check the initial first receiver among the first MBS receivers of the ASN-GWs 114, 124 and 134, and according thereto, can set only one MCBCS proxy as a master MCBCS proxy and set the remaining MCBCS proxies as slave MCBCS proxies.

When the MCBCS controller receives the notification message from the ASN-GW 114, the MCBCS controller 140 stores information included in the notification message, for example, an ID of the master MCBCS proxy 118, and performs a session start process to notify session information that includes MBS channel information including Multicast Internet Protocol (IP) Address/Broadcast IP Address used for providing MCBCS contents, transmission time information, and encoding/decoding information.

When the master MCBCS proxy 118 of the ASN-GW 114 receives the session information from the MCBCS controller 140, the master MCBCS proxy 118 of the ASN-GW 114, as described above, assigns MCBCS control information/Layer 2 information for MCBCS and macro diversity, i.e., information on modulation, subchannel, symbol, offset and MCID, and time information used for transmitting MCBCS contents. Further, the master MCBCS proxy 118 of the ASN-GW 114 transmits the assigned MCBCS control information/Layer 2 information to the BSs located its own zone and the slave MCBCS proxies 128 and 138 in a broadcast/multicast scheme.

When the slave MCBCS proxies 128 and 138 receive the MCBCS control information/Layer 2 information from the master MCBCS proxy 118, the slave MCBCS proxies 128 and 138 transmit the received MCBCS control information/Layer 2 information to the BSs located in their own zones, and at this time, the slave MCBCS proxies simply provide relay paths between the master MCBCS proxy 118 and the BSs. Therefore, all BSs existing in one MBS zone 200 generate MBS-MAP using the same MCBCS control information/Layer 2 information, and provide MCBCS contents to MSs in the MBS zone 200 through the MBS-MAP, and at this time, the MSs obtain macro diversity gain.

While the invention has been shown and described with reference to a certain preferred embodiment thereof, it will be understood by those skilled in the art that various changes in form and details may be made therein without departing from the spirit and scope of the invention as defined by the appended claims.

The invention claimed is:
1. A method for supporting Multicast and Broadcast Service (MCBCS) proxy selection for MCBCS and macro diversity in a wireless communication system including a plurality of Access Service Networks (ASNs) for the MCBCS in one Multicast and Broadcast Service (MBS) zone, the method comprising:
selecting a first MCBCS proxy among MCBCS proxies in the plurality of ASNs as a master MCBCS proxy, and selecting other MCBCS proxies except for the first MCBCS proxy as slave MCBCS proxies;
transmitting, at the first MCBCS proxy, information for macro diversity to the slave MCBCS proxies;
transmitting, at the first MCBCS proxy, a notification message including an identifier of the master MCBCS proxy to the slave MCBCS proxies and an MCBCS controller; and
receiving, at the first MCBCS proxy, session information from the MCBCS controller in response to the notification message,
wherein the master MCBCS proxy first receives an MCBCS join message from a Mobile Station (MS) in the MBS zone.

2. The method of claim 1, wherein the session information includes at least one of MBS channel information including Multicast/Broadcast Internet Protocol (IP) Address, transmission time information, and encoding/decoding information.

3. The method of claim 1, wherein the information for macro diversity is Layer 2 information.

4. The method of claim 3, wherein the Layer 2 information includes at least one of modulation information, subchannel information, symbol information, offset information and Multicast Connection Identifier (MCID) information, and time information used for transmitting MCBCS contents.

5. The method of claim 3, further comprising:
transmitting, at the master MCBCS proxy and the slave MCBCS proxies, the Layer 2 information to all Base Station (BSs) in the MBS zone.

6. The method of claim 3, wherein the transmitting of the Layer 2 information comprises transmitting the Layer 2 information to BSs of the slave MCBCS proxies through relay paths provided by the slave MCBCS proxies.

7. A method for managing Multicast and Broadcast Service (MCBCS) proxy for MCBCS and macro diversity in a wireless communication system including a plurality of Access Service Networks (ASNs) for the MCBCS in one Multicast and Broadcast Service (MBS) zone, the method comprising:
receiving, at an MCBCS proxy, an MCBCS join message from a Mobile Station (MS) in the MBS zone;
checking, at the MCBCS proxy, whether the MS is a first MS for the MCBCS in the MBS zone based on the MCBCS join message;
setting, at the MCBCS proxy, the MCBCS proxy itself as a master MCBCS proxy when the MS is the first MS;
notifying, by the MCBCS proxy, an MCBCS controller of the setting of the master MCBCS proxy to an MCBCS controller for according to a session start procedure, and notifying other MCBCS proxies of the setting of the master MCBCS proxy so that the other MCBCS proxies are set as slave MCBCS proxies for the MCBCS; and
transmitting, at the MCBCS proxy, Layer 2 information to be assigned for the macro diversity to the slave MCBCS proxies according to the session start procedure.

8. The method of claim 7, wherein the notifying steps comprise:
transmitting, by the MCBCS proxy, a notification message including an identifier of the master MCBCS proxy to the slave MCBCS proxies and the MCBCS controller.

9. The method of claim 8, further comprising:
receiving, at the MCBCS proxy, session information from the MCBCS controller in response to the notification message.

10. The method of claim 9, wherein the session information includes at least one of MBS channel information including Multicast/Broadcast Internet Protocol (IP) Address, transmission time information, and encoding/decoding information.

11. The method of claim 7, wherein the Layer 2 information includes at least one of modulation information, subchannel information, symbol information, offset information and Multicast Connection Identifier (MCID) information, and time information used for transmitting MCBCS contents.

12. An apparatus for supporting Multicast and Broadcast Service (MCBCS) proxy selection for MCBCS and macro diversity in a wireless communication system including a plurality of Access Service Networks (ASNs) for the MCBCS in one Multicast and Broadcast Service (MBS) zone, the apparatus comprising:
a reception unit configured to receive an MCBCS join message from a Mobile Station (MS);
an MCBCS proxy setting unit configured to check whether the MS is a first MS for the MCBCS in the MBS zone based on the MCBCS join message, and set a status of an MCBCS proxy corresponding the MS as a master when the MS is the first MS;
a transmission unit configured to notify an MCBCS controller of the setting of the master according to a session start procedure, and to other MCBCS proxies except for the master MCBCS proxy in the MBS zone so that the other MCBCS proxies are set as slave MCBCS proxies for the MCBCS, or transmit Layer 2 information to the other MCBCS proxies for the macro diversity; and
an information generation unit configured to generate the Layer 2 information according to the session start procedure, and transmit the Layer 2 information to the transmission unit.

13. The apparatus of claim 12, wherein the Layer 2 information includes at least one of modulation information, subchannel information, symbol information, offset information and Multicast Connection Identifier (MCID) information, and time information used for transmitting MCBCS contents.

14. The apparatus of claim 12, wherein the information generation unit is configured to generate the Layer 2 information using session information received according to the session start procedure, and the session information includes at least one of MBS channel information including Multicast/ Broadcast Internet Protocol (IP) Address, transmission time information, and encoding/decoding information.

15. The apparatus of claim 12, further comprising:
a list storage unit configured to maintain and store a list of the other MCBCS proxies in the MBS zone.

* * * * *